United States Patent [19]

Inoue

[11] Patent Number: 5,423,725
[45] Date of Patent: Jun. 13, 1995

[54] PLANETARY-FRICTION TYPE SPEED CHANGE DEVICE

[75] Inventor: Nobuyuki Inoue, Kanagawa, Japan

[73] Assignee: Canon Kabushiki Kaisha, Tokyo, Japan

[21] Appl. No.: 242,064

[22] Filed: May 13, 1994

Related U.S. Application Data

[63] Continuation of Ser. No. 920,209, Jul. 27, 1992, abandoned.

[30] Foreign Application Priority Data

Jul. 29, 1991 [JP] Japan .................................. 3-188671

[51] Int. Cl.6 ............................................. F16H 13/06
[52] U.S. Cl. ...................................... 475/196; 476/36
[58] Field of Search ................ 475/189, 195, 196, 346, 475/902, 347; 476/36

[56] References Cited

U.S. PATENT DOCUMENTS

| | | | |
|---|---|---|---|
| 1,380,006 | 5/1921 | Nielsen | 475/189 |
| 2,460,629 | 2/1949 | Fawick | 475/902 X |
| 2,901,924 | 9/1959 | Banker | 475/189 X |
| 2,997,899 | 8/1961 | Thiele | 475/196 |
| 3,244,026 | 4/1966 | De Kay | 475/196 |
| 3,688,600 | 9/1972 | Leonard | 475/189 X |
| 3,757,608 | 9/1973 | Willner | 475/902 X |
| 3,955,661 | 5/1976 | Popper et al. | 475/196 X |
| 4,258,589 | 3/1981 | Mitchell | 475/189 |

FOREIGN PATENT DOCUMENTS

| | | | |
|---|---|---|---|
| 794188 | 2/1936 | France | 475/189 |
| 1-105055 | 4/1989 | Japan | 475/196 |

*Primary Examiner*—Rodney H. Bonck
*Attorney, Agent, or Firm*—Fitzpatrick Cella, Harper & Scinto

[57] ABSTRACT

A planetary-friction type speed change device includes: (a) a sun roller arranged to rotate about an axis in response to a motive rotation; (b) an outer ring substantially coaxial with the sun roller; (c) a plurality of planetary rolling elements disposed between the sun roller and the outer ring to contact each of an outer circumferential face of the sun roller and an inner circumferential face of the outer ring; (d) a casing member for housing therein the sun roller, the plurality of planetary rolling elements, and the outer ring such that the outer ring is movable relative to the casing member; and (e) an elastic member, disposed within the casing member, for supporting and axially pressing the outer ring such that the outer ring is movable in a radial direction relative to the casing member. The rotation of the sun roller causes the plurality of planetary rolling elements to revolve, thereby producing a rotation output at a reduced speed.

7 Claims, 5 Drawing Sheets

PLANETARY-FRICTION TYPE SPEED CHANGE DEVICE

This application is a continuation of prior application Ser. No. 07/920,209 filed on Jul. 27, 1992, now abandoned.

BACKGROUND OF THE INVENTION

1. Field of the Invention

This invention relates to a planetary-friction type speed change device arranged to have planetary rolling elements caused to revolve by the rotation of a sun roller and to give an output rotation at a speed reduced by the revolution of the planetary rolling elements.

2. Description of the Related Art

FIGS. 4 and 5 show by way of example the arrangement of the conventional planetary-friction type speed change device. FIG. 4 is a vertical section of the arrangement and FIG. 5 is a cross section of the same. These illustrations include a motor 1; a lower casing 2'; an upper casing 3'; a motor shaft 4; a sun roller 5 which is secured to the motor shaft 4; steel balls 6 which are planetary rolling elements; outer rings 7a' and 7b'; an elastic member 8 which is arranged to press the sun roller 5, the steel balls 6 and the outer rings 7a' and 7b' into contact with each other at a given amount of pressure for imposing a pre-load. A retainer 9 is arranged to keep the steel balls 6 at intervals of a given distance. The retainer 9 is secured to an output shaft 10.

The outer rings 7a' and 7b' are arranged coaxially with the sun roller 5. The steel balls 6 are respectively arranged between the outer circumferential surface of the sun roller 5 and the inner circumferential surface of each of the outer rings 7a' and 7b' and are approximately equally spaced by means of the retainer 9. The retainer 9 is fixedly connected to the output shaft 10 and is rotatably carried by an output-shaft bearing part 3a. The outer rings 7a' and 7b', the steel balls 6 and the sun roller 5 are kept in pressed contact under a given amount of pressure by the elastic member 8.

When the sun roller 5 rotates, the steel balls 6 revolve together with the retainer 9 while each of the steel balls 6 are rolling, because the outer rings 7a' and 7b', the steel balls 6, and the sun roller 5 are in contact with each other under the given amount of pressure. As a result, the output shaft 10 rotates at a reduced speed which is the same as the frequency of revolution of the steel balls 6.

It has been practiced to arrange the speed change device of this kind in the following manner: The diameter of the inner circumferential face of the lower casing 2' is set in such a way as to have the outer rings 7a' and 7b' in positions where they are coaxial with the sun roller 5. Then, the outer rings 7a' and 7b' are positioned and mounted by fitting them with pressure into the lower casing 2'. Such arrangement requires a high degree of precision for the inner diameter and outer diameter of the outer rings 7a' and 7b' and the diameter of the inner circumference of the lower casing 2'. These parts thus necessitate machining with a high degree of dimensional precision. This requirement causes an increase in cost. In addition to this shortcoming, another shortcoming of the conventional speed change device is that when eccentricity occurs between the sun roller 5 and the outer rings 7a' and 7b', an unsymmetrical contact of the steel balls 6, vibrations, and a decrease in efficiency result from the eccentricity. Further, the steel balls 6 roll on the inner circumferential faces of the outer rings 7a' and 7b' at a high speed while the speed change device is in operation. Since the outer rings 7a' and 7b' are directly in contact with the casings 2' and 3', the vibrations caused by the rolling movement of the steel balls 6 are transmitted to the outside of the speed change device through the outer rings 7a' and 7b' to cause vibrations and noise.

SUMMARY OF THE INVENTION

One aspect of this invention lies in the provision of a planetary-friction type speed change device of the kind having a plurality of planetary rolling elements arranged in contact with the outer circumferential face of a sun roller and the inner circumferential faces of outer rings and arranged to obtain output rotation by rotating the sun roller in such a way as to cause the planetary rolling elements to revolve relative to the outer rings, wherein the outer rings are carried and arranged to be movable in a radial direction, so that self-aligning of the outer rings can be attained.

The above and other aspects and features of this invention will become apparent from the following detailed description of embodiments thereof taken in connection with the accompanying drawings.

DETAILED DESCRIPTION OF THE PREFERRED EMBODIMENTS

Figure 1:
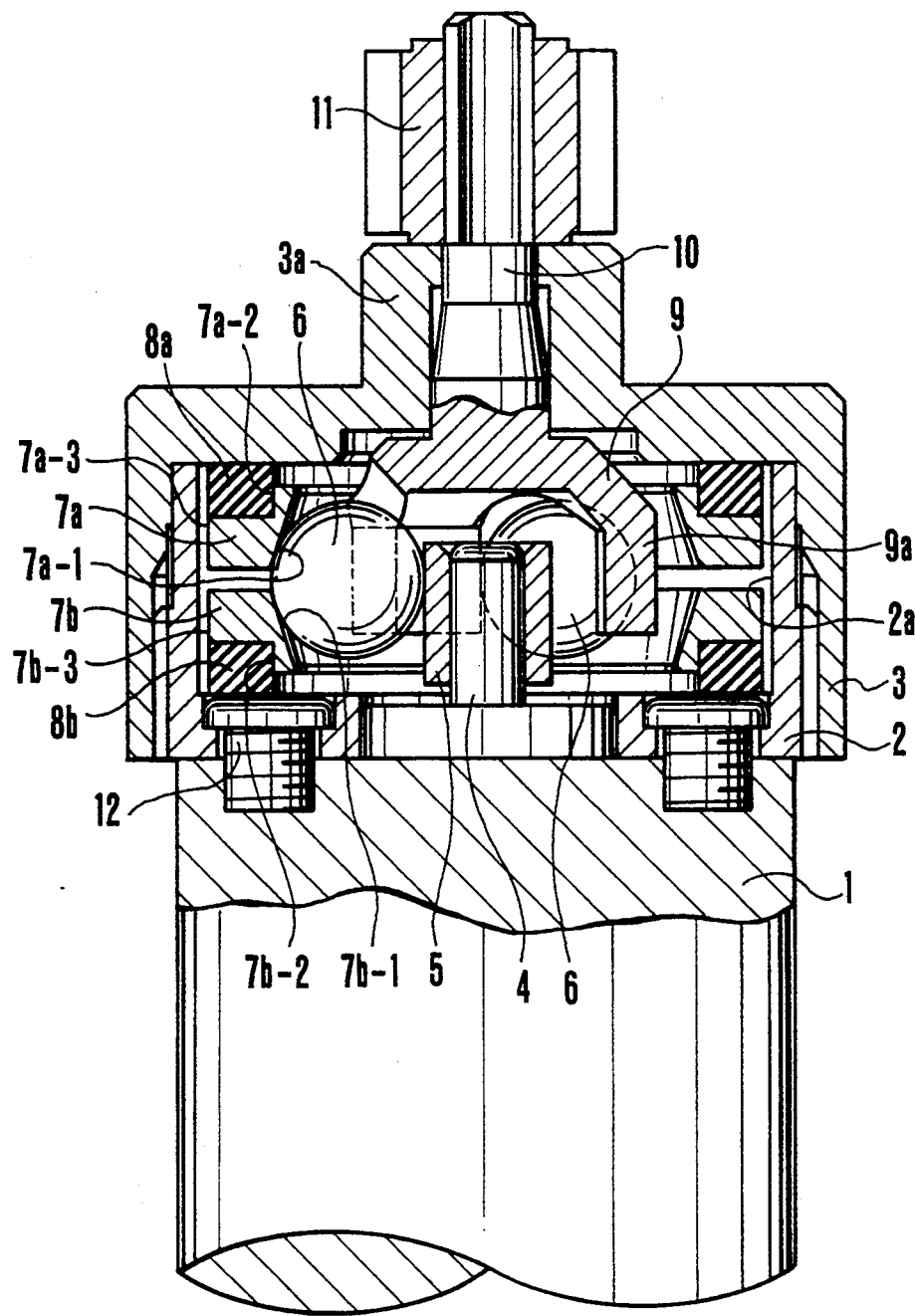
FIG. 1 is a vertical section showing the arrangement of a planetary-friction type speed change device arranged as an embodiment of this invention.
Figure 2:
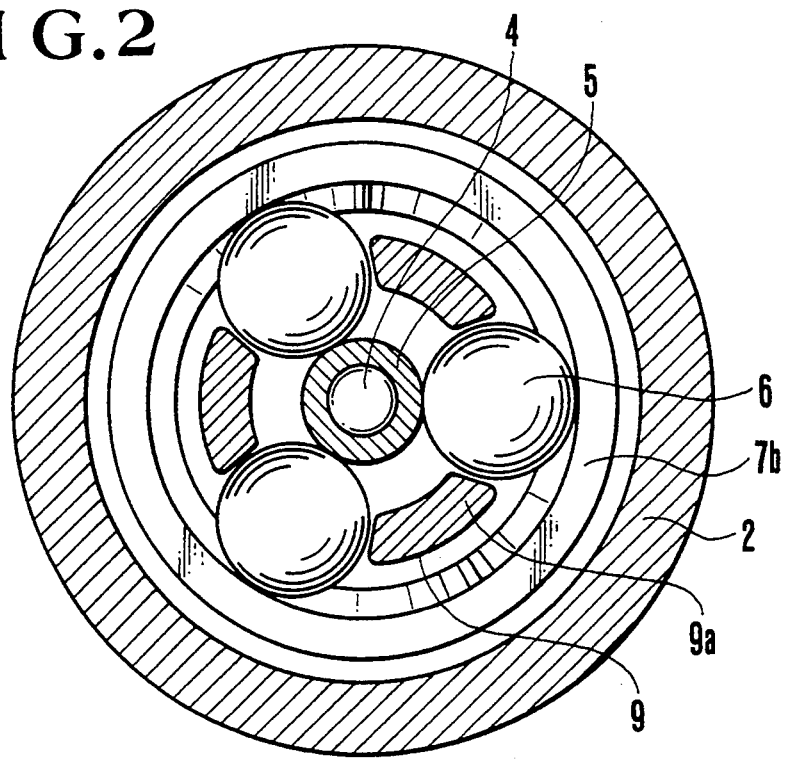
FIG. 2 is a cross section of the arrangement of the embodiment shown in FIG. 1.

The following describes an embodiment of this invention with reference to FIGS. 1 and 2, which show the features of this invention: FIG. 1 is a vertical section showing the arrangement of a first embodiment. FIG. 2 is a cross section of the same arrangement. The illustrations include a motor 1; a lower casing 2; an upper casing 3 which has a bearing part 3a formed integrally therewith; a motor shaft 4; a sun roller 5 which is secured to the motor shaft 4; steel balls 6 which are planetary rolling elements (three steel balls 6a, 6b and 6c are provided in the case of this embodiment); outer rings 7a and 7b; elastic members 8a and 8b which are made of, for example, silicone rubber; a retainer 9 which is arranged to retain the steel balls 6 in position; an output shaft 10 which is formed integrally with the retainer 9; and a pinion gear 11 secured to the output shaft 10 and arranged to give a decelerated output. A pair of the outer rings 7a and 7b are arranged almost or substantially coaxially with the sun roller 5. The outer rings 7a and 7b have faces 7a-1 and 7b-1 formed in a tapered shape for rolling contact with the steel balls 6 and are provided with cutout parts 7a-2 and 7b-2 for holding the elastic members 8a and 8b, which are arranged to cover the whole circumferential faces of the outer rings 7a and 7b opposed to the upper and lower casings 3 and 2, respectively. The tapered faces 7a-1 and 7b-1 of the outer rings 7a and 7b are opposed to each other. A plurality (3 in the case of the embodiment) of steel balls 6 are interposed between the outer circumferential face of the sun roller 5 and the inner circumferential tapered faces 7a-1 and 7b-1 of the outer rings 7a and 7b. These steel balls 6 are kept in an approximately evenly spaced state by the retainer 9. The retainer 9 is provided with a plurality of leg parts 9a for holding the steel balls 6 with a suitable clearance in such a way as to allow the steel balls 6 to be freely rollable. The retainer 9 and the output shaft 10 are integrally molded of, for example, a plastic material and are rotatably carried by the bearing part 3a of the upper casing 3. The output shaft 10 has the pinion gear 11 secured to its fore end part. The play of the output shaft 10 in the direction of thrust is restricted with the pinion gear 11 abutting on the bearing part 3a in the direction of thrust. The outer rings 7a and 7b are carried through the elastic members 8a and 8b in such a way as not to come into contact directly with the upper and lower casings 3 and 2. The elastic members 8a and 8b are thus arranged to keep the outer rings 7a and 7b, the plurality of steel balls 6, and the sun roller 5 in contact with each other under a given amount of pressure. When the steel balls 6 roll, the outer rings 7a and 7b are prevented from rotating by frictional forces between the outer rings 7a and 7b and the elastic members 8a and 8b and between the elastic members 8a and 8b and the upper and lower casings 3 and 2. The lower casing 2 is secured to the motor 1 by means of mounting screws 12. The outer circumferential part of the lower casing 2 and the inner circumferential part of the outer casing 3 are respectively provided with male and female threads which engage each other. The upper casing 3 is thus screwed and secured to the lower casing 2. There is provided a clearance between the inner circumferential face 2a of the lower casing 2 and the outer circumferential faces 7a-3 and 7b-3 of the outer rings 7a and 7b. A clearance is also provided between the inner circumferential face 2a of the lower casing 2 and the elastic members 8a and 8b. The outer rings 7a and 7b are thus arranged to be displaceable in a radial direction to some extent.

Next, the operation of the planetary-friction type speed change device arranged in the above-stated manner is described as follows: When the motor shaft 4 rotates, the plurality of steel balls 6 revolve over the tapered faces of the outer rings 7a and 7b together with the retainer 9 while they are rotating, because the outer rings 7a and 7b, the steel balls 6, and the sun roller 5 are kept in contact with each other under the predetermined amount of pressure by the elastic members 8a and 8b. As a result, the output shaft 10 rotates at a speed which is the same as the frequency of revolution of the plurality of steel balls 6.

Figure 3:
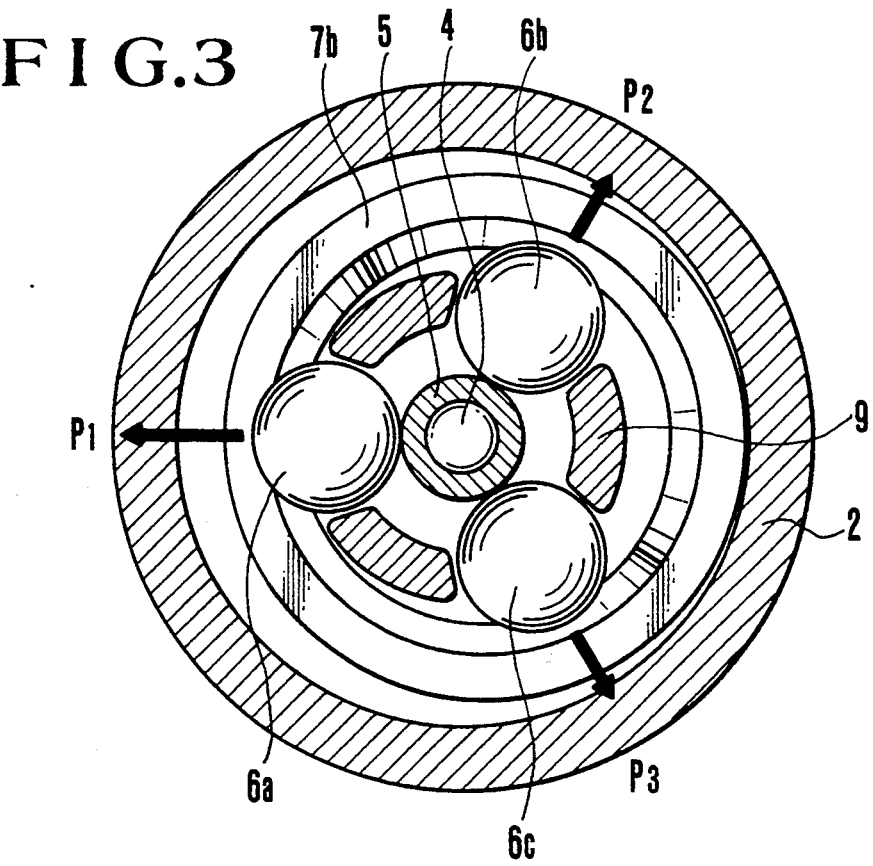
FIG. 3 is a cross section showing the operation of the embodiment of FIG. 1.
Figure 4:
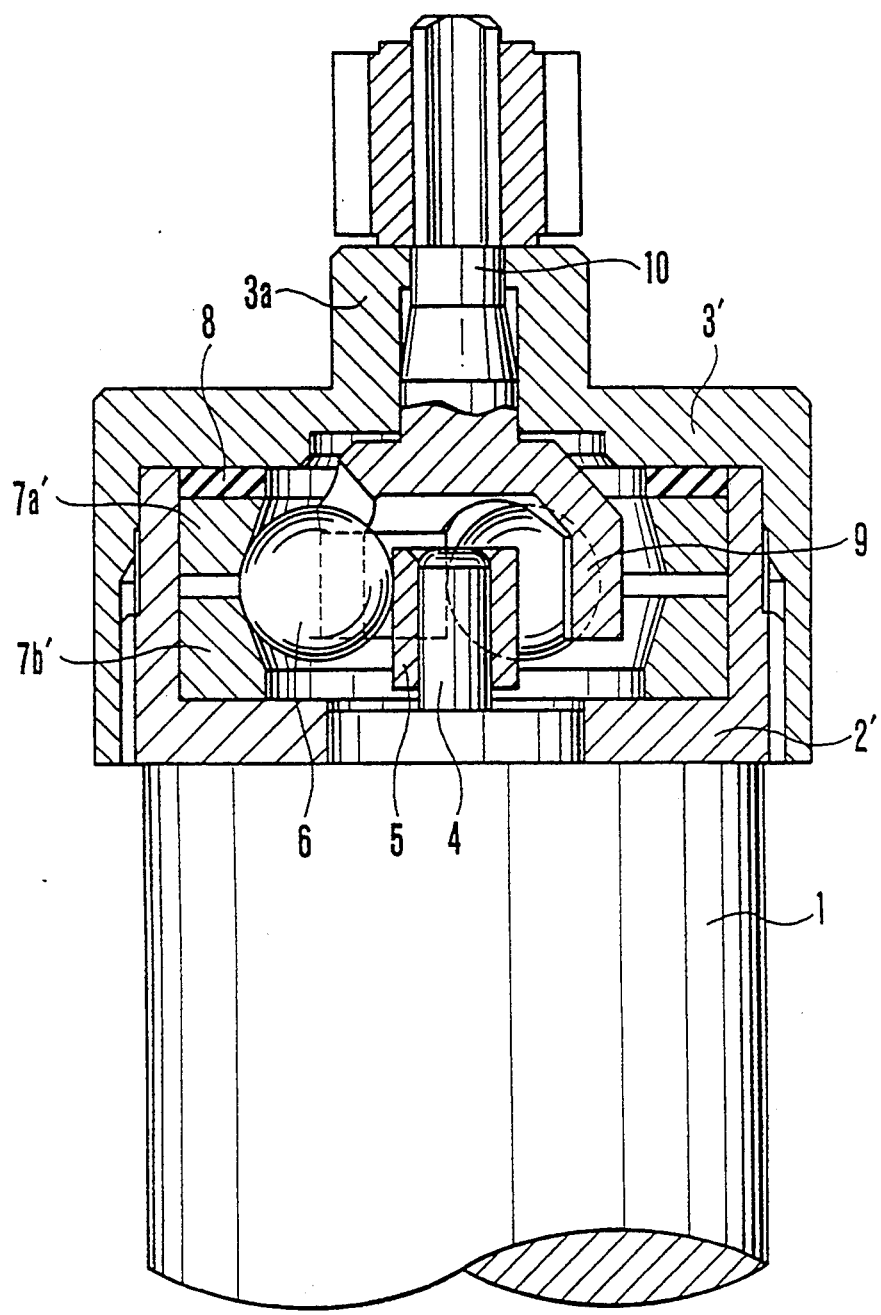
FIG. 4 is a vertical section showing the arrangement of the conventional planetary-friction type speed change device.
Figure 5:
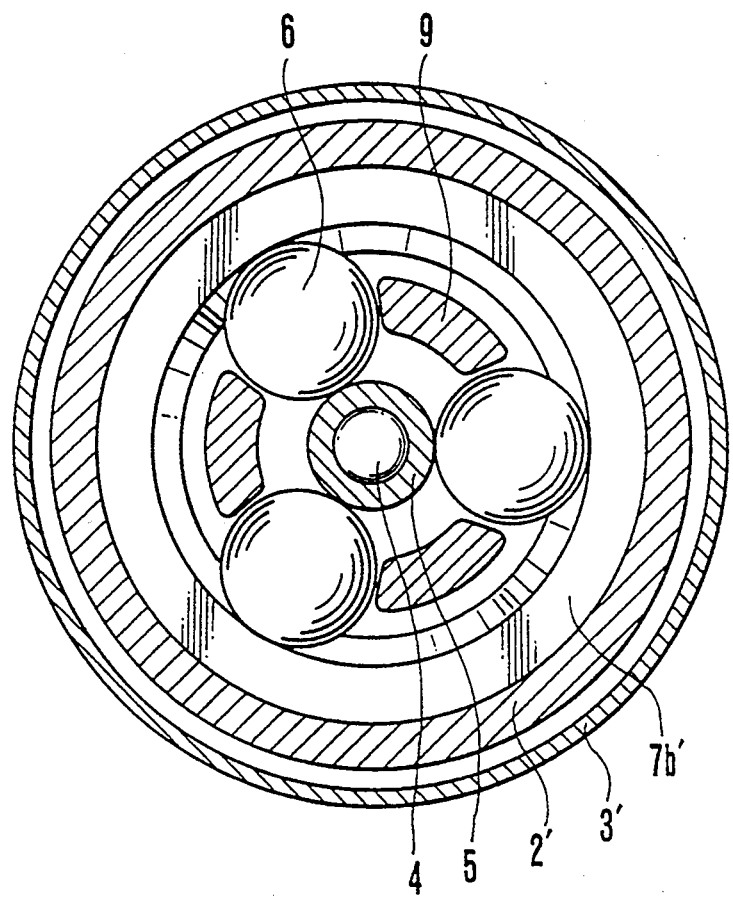
FIG. 5 is a cross section of the arrangement of FIG. 4.

Next, an arrangement of the embodiment regarding feature of the outer rings 7a and 7b is described with reference to FIG. 3. The outer rings 7a and 7b are carried only by the elastic members 8a and 8b and are unrestricted in the radial direction. Therefore, with the speed change device in its assembled state, the coaxial relation of the outer rings 7a and 7b to the sun roller 5 (the coincidence of their centers) is unassured. In the event of unsymmetrical contact due to eccentricity, for example, the outer rings 7a and 7b become eccentric. Then, a pressing force P1 exerted on the steel ball 6a which is located closer to the sun roller 5 becomes greater than pressing forces P2 and P3 exerted on the steel balls 6b and 6c which are located farther from the sun roller 5. As a reaction to this pressing force P1, an outward force on the outer rings 7a and 7b becomes strongest in the direction in which the outer rings 7a and 7b eccentrically come closer to the center. When the planetry-friction type speed change device operates in this state, the force is repeatedly exerted in this direction. This force moves the outer rings 7a and 7b in the radial direction, so that the positions of the outer rings 7a and 7b are automatically adjusted to the positions where they become coaxial with the sun roller 5.

Figure 6:
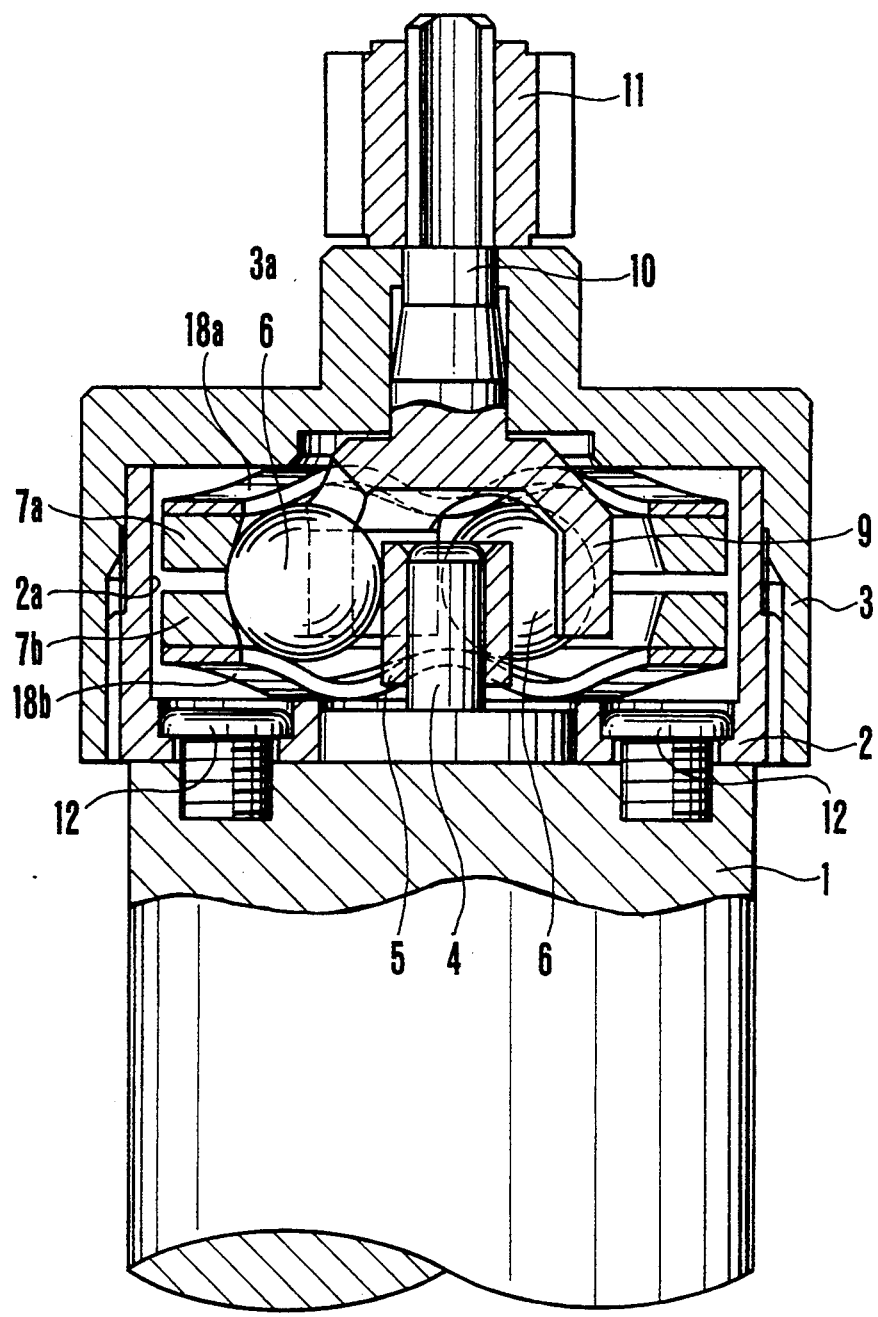
FIG. 6 is a vertical section showing the arrangement of another embodiment of this invention.

In the embodiment described above, a rubber material is employed for the elastic members 8a and 8b. However, the elastic member 8a and 8b may be replaced with wave washers 18a and 18b which have a spring-like property and are usable as elastic members as shown in FIG. 6, which shows another embodiment of this invention. Referring to FIG. 6, the wave washer 18a which is employed as one of the elastic members is arranged to urge the outer ring 7a relative to the upper casing 3 toward the central part of the device (downward as viewed in FIG. 6). The other wave washer 18b is arranged to urge the outer ring 7b relative to the lower casing 2 toward the central part of the device (upward as viewed in FIG. 6). This arrangement also gives an output at a reduced speed obtained by virtue of the rolling movement of the steel balls 6 in the same manner as in the case of the embodiment described in the foregoing. Further, each of the wave washers 18a and 18b is arranged also to have a clearance with regard to the inner circumferential face 2a of the lower casing 2. Therefore, in the event of occurrence of eccentricity, this embodiment is also capable of effectively performing the self-aligning action.

As described in the foregoing, even in the event of eccentricity or deviation from a perfect alignment of the sun roller and the outer rings in the assembled state, the arrangement of each of the embodiments enables the speed change device to automatically shift the positions of the outer rings to optimum positions where the pressing forces on the planetary rolling elements become equal to each other when the device is set to operate. The invented arrangement thus obviates the necessity of high precision machining work on the outer rings and outer ring mounting parts and facilitates machining and assembly work on the parts of the embodiment. The invention, therefore, permits a reduction in cost of the planetary-friction type speed change device. It is another advantage of the invention that the vibrations and noise of the outer rings which result from the rolling movement of the planetary rolling elements are absorbed by the elastic members without transmitting them to the outside. The vibrations and noise of the device thus can be lowered.

What is claimed is:

1. A planetary-friction type speed change device comprising:
 a) a sun roller arranged to rotate about an axis in response to a motive rotation;
 b) an outer ring substantially coaxial with said sun roller;
 c) a plurality of planetary rolling elements disposed between said sun roller and said outer ring to contact each of an outer circumferential face of said sun roller and an inner circumferential face of said outer ring;

d) a casing member for housing therein said sun roller, said plurality of planetary rolling elements, and said outer ring such that said outer ring is movable relative to said casing member; and e) an elastic member disposed within said casing member, for supporting and axially pressing said outer ring such that said outer ring is movable in a radial direction relative to said casing member, wherein a gap is provided in the radial direction between said elastic memter and said casing member, wherein the rotation of said sun roller causes said plurality of planetary rolling elements to revolve, thereby producing a rotation output at a reduced speed, and wherein said outer ring is divided into two parts in the axial direction, and wherein said elastic member individually presses and carries the two parts of said outer ring.

2. A device according to claims 1, wherein said plurality of planetary rolling elements comprises balls, and wherein the inner circumferential face of said outer ring, which is in contact with said balls, is formed in a tapered shape, so that an elastic pressing force occurring in an axial direction of the axis of said sun roller is converted into a pressing force of said outer ring onto said balls.

3. A device according to claim 1, further comprising a transmission member for externally outputting a revolution of said plurality of planetary rolling members, said transmission member having a plurality of portions respectively disposed between two adjacent planetary rolling elements such that said transmission member is caused to rotate by the revolution of said plurality of planetary rolling elements.

4. A device according to claim 3, wherein said casing member comprises a bearing part for rotatably carrying said transmission member.

5. A device according to claim 1, wherein said elastic member comprises a rubber material.

6. A device according to claim 1, wherein said elastic member comprises a spring material.

7. A planetary-friction type speed change device comprising:

a) a sun roller arranged to rotate about an axis in response to a motive rotation;

b) an outer ring substantially coaxial with said sun roller;

c) a plurality of planetary rolling elements disposed between said sun roller and said outer ring to contact each of an outer circumferential face of said sun roller and an inner circumferential face of said outer ring;

d) a casing member for housing therein said sun roller, said plurality of planetary rolling elements, and said outer ring such that said outer ring is movable relative to said casing member; and e) an elastic member, disposed within said casing member, for supporting and axially pressing said outer ring such that said outer ring is movable in a radial direction relative to said casing member, wherein a gap is provided in the radial direction between said elastic memter and said casing member, wherein the rotation of said sun roller causes said plurality of planetary rolling elements to revolve, thereby producing a rotation output at a reduced speed, wherein said plurality of planetary rolling elements comprises balls, and wherein the inner circumferential face of said outer ring, which is in contact with said balls, is formed in a tapered shape, so that an elastic pressing force occurring in an axial direction of the axis of said sun roller is converted into a pressing force of said outer ring onto said balls, and wherein said outer ring is divided into two parts in the axial direction, and wherein said elastic member individually presses and carries the two parts of said outer ring.

* * * * *

UNITED STATES PATENT AND TRADEMARK OFFICE
CERTIFICATE OF CORRECTION

PATENT NO. : 5,423,725
DATED : June 13, 1995
INVENTOR(S) : Noboyuki Inoue

It is certified that error appears in the above-indentified patent and that said Letters Patent is hereby corrected as shown below:

On the title page:

ITEM [75]:

"Kanagawa," should read --Kawasaki--.

After item [56], the Attorney, Agent, or Firm:

"Fitzpatrick Cella, Harper & Scinto" should read
--Fitzpatrick, Cella, Harper and Scinto--.

Column 3, line 58, "feature" should read -- the self-aligning feature --.

Column 5, line 10, "memter" should read -- member --; and
         line 19, "Claims 1," should read --Claim 1, --.
Column 6, line 23, "memter" should read -- member --.

Signed and Sealed this

Sixth Day of August, 1996

Attest:

BRUCE LEHMAN

Attesting Officer

Commissioner of Patents and Trademarks